Patented Dec. 11, 1945

2,390,736

UNITED STATES PATENT OFFICE 2,390,736

KETONIC ROSIN DERIVATIVES

Donald Price, New York, N. Y., and Everette L. May, Chevy Chase, Md., assignors to National Oil Products Company, Harrison, N. J., a corporation of New Jersey No Drawing. Application December 3, 1943, Serial No. 512,840

18 Claims. (Cl. 260—97)

This invention relates to novel fatty keto derivatives of rosin and allied substances and to a process for making the same.

It has been discovered by this invention that rosin and analogous substances may be condensed with substances yielding higher fatty acyl radicals to produce keto derivatives having unique properties rendering them suitable for many technical applications. In general, these products may best be prepared by reacting a higher fatty acyl halide with rosin or a like substance in the presence of a suitable catalyst; however, the derivatives may be prepared in other ways, for instance, by condensation of acid anhydrides with rosin.

Rosin was mentioned above as a suitable starting material in the production of derivatives according to this invention. However, instead of rosin, there may be employed any modified rosins, such as hydrogenated, dehydrogenated and disproportionated rosins. Likewise, there may be employed substances containing the characteristic components of rosin such as tall oils, rosin oils, fossil resins, and the like. Instead of the free rosin compounds, there may be employed esters of the same, such as methyl, ethyl, ethylene glycol, glycerol and similar esters. Hereinafter these materials and allied substances will be generically designated "rosin substances."

The higher fatty acyl groups to be introduced into the rosin compounds to produce ketone derivatives according to this invention should contain from 8 to 22, and preferably from 10 to 20, carbon atoms. Preferably these groups will be supplied in the form of acyl halides, examples of suitable acyl halides being the caproyl, undecyl, lauryl, myristyl, palmityl, margaryl, stearyl, oleyl, linoleyl, etc. chlorides. Obviously, instead of the pure acyl halides, there may be employed mixtures containing acyl halides coming within the requirements above set forth such, for instance, as the mixed acyl halides derived from the mixed acyl radicals occurring in animal, marine and vegetable oils, fats and waxes, or fractions of such oils, fats, and waxes on the order of coconut oil, corn oil, cottonseed oil, peanut oil, rapeseed oil, soyabean oil, mustard seed oil, lard oil, whale oil, menhaden oil, sperm oil, and the like. The naphthenic acid halides, on account of their similarity in properties to the fatty acids, may also be used in the practice of this invention.

The acyl halide and rosin substances may be condensed together in the presence of a Friedel-Crafts catalyst such as AlCl$_3$, FeCl$_3$, BF$_3$, or surface-active substances such as the natural and activated hydrosilicate clays. In general it will be desired to combine approximately 1 mol of acylating agent with each mol of rosin substance; however, the rosin nucleus is capable of receiving more than one acyl group and this ratio may be increased to two or more mols of acylating agent per mol of rosin compound either for the purpose of introducing a plurality of acyl groups into the rosin nucleus or to provide an excess to insure rapid and complete reaction. The temperature may be varied as found suitable by experiment for each individual case and in accordance with the products desired. In general the reaction may be conducted at temperatures ranging between —20° and 60° C. and preferably between —5° and 30° C. The reaction will generally be complete within about 40 hours at room temperature (a longer period will be required at lower temperatures, and a shorter period at elevated temperatures) but, again, this factor may be adjusted as found best by experiment in each individual case in order to secure the particular products desired. At the completion of the reaction, the reaction mixture may be separated from the catalyst by distillation or by extracting the catalyst with water or aqueous solution. The product may be further worked up by distillation to separate the keto products from any unreacted material as well as to separate the mono- and di-keto products from each other.

Products according to this invention consist of viscous oils having in general the properties of ester gums, but being superior to the latter in stability against oxidation and deterioration from photochemical action. The properties of these products vary according to the nature of the starting materials employed and the conditions under which the condensation is carried out. Those products derived from esterified rosin substances will retain the ester grouping and the properties and reactions thereof, and will, in addition, possess properties of solubility, stability, etc. imparted by the higher fatty keto group introduced into the rosin nucleus in accordance with this invention.

Following are examples for the preparation of fatty ketonic rosin products according to this invention. All parts given are by weight.

Example I

| | Parts |
|---|---|
| Methyl ester of disproportionated rosin | 25 (1 mol) |
| ("Galex methyl ester," a product containing a large proportion of dehydroabietic acid, manufactured by the G. & A. Laboratories of Savannah, Ga.) | |
| Lauroyl chloride | 16 (1 mol) |
| Nitrobenzene | 150 |
| Aluminum chloride | 23 |

The disproportionated rosin ester, lauroyl chloride and nitrobenzene were mixed in a reaction vessel cooled by an ice-salt bath. The aluminum chloride was gradually added to the mixture, with stirring, over a period of 15 minutes, during which time the temperature was permitted to rise to 18° C. When the initial reaction had subsided, the mixture was allowed to warm slowly to 33° C. over a period of 5 hours, during which time the reaction continued with copious evolution of hydrogen chloride. The mixture was allowed to stand at 33° C. for 40 hours after which it was poured into a dilute hydrochloric acid-ice mixture. The nitrobenzene was stripped from the insoluble material by steam distillation and the brown, sticky, semi-solid undistilled residue was taken up in ether, and the ether solution washed successively with water, sodium-carbonate solution and again with water. The solution was then dried over calcium chloride, shaken with animal charcoal and evaporated down to yield 23 parts of a dark brown viscous oil which analysis and an aluminum isopropoxide reduction indicated to be the desired disproportionated rosin-fatty ketone.

*Example II*

| | Parts |
|---|---|
| Methyl abietate | 10 (1 mol) |
| Lauroyl chloride | 7 (1 mol) |
| Nitrobenzene | 60 |
| Aluminum chloride | 10 |

The above-listed materials were reacted together exactly as were the corresponding materials in Example I, with the sole exception that the temperature was raised to 55° C. instead of 33° C. to complete the reaction. There were recovered 10 parts of a brown viscous oil having a fruit-like odor.

*Example III*

| | Parts |
|---|---|
| Methyl abietate | 20 (1 mol) |
| Stearoyl chloride | 19 (1 mol) |
| Nitrobenzene | 100 |
| Aluminum chloride | 19 |

The methyl abietate was dissolved in the nitrobenzene and the solution was cooled to 0° C. The stearoyl chloride was then added after which the aluminum chloride was slowly stirred in. The mass was allowed to stand for 48 hours at room temperature after which it was warmed to 75° C. for 15 minutes to complete the reaction. The reaction mass was then worked up with hydrochloric acid-ice, etc., exactly as were the corresponding masses of the preceding examples, yielding a dark-colored, waxy solid, the ketonic structure of which was confirmed by an aluminum isopropoxide reduction.

*Example IV*

| | Parts |
|---|---|
| Methyl ester of disproportionated rosin ("Galex methyl ester," a product manufactured by the G. & A. Laboratories, Savannah, Ga.) | 25 (1 mol) |
| Capryloyl chloride | 12.5 (1 mol) |
| Nitrobenzene | 110 |
| Aluminum chloride | 23 |

The disproportionated rosin ester, capryloyl chloride and nitrobenzene were mixed and the resultant solution was cooled to 0° C. The aluminum chloride was then slowly added, with stirring, and continued cooling to 0° C. The temperature of the mass was maintained at 0° C. for three hours after which the mass was permitted to warm to room temperature. The mass was left standing for 40 hours after which it was worked up with hydrochloric acid-ice, etc. exactly as were the corresponding masses in the preceding examples. The yield was 23 parts of a viscous oil.

*Example V*

(1)

| | Parts |
|---|---|
| Methyl ester of disproportionated rosin ("Galex methyl ester," a product manufactured by G. & A. Laboratories, Savannah, Ga.) | 25 (1 mol) |
| Palmitoyl chloride | 23 (1 mol) |
| Nitrobenzene | 110 |
| Aluminum chloride | 23 |

(2)

| | |
|---|---|
| Methyl dihydroabietate | 25 (1 mol) |
| Stearoyl chloride | 23 (1 mol) |
| Nitrobenzene | 100 |
| Aluminum chloride | 23 |

The materials in each of the recipes 1 and 2 were reacted together exactly as were the corresponding materials in Example IV. From the materials of recipe 1 was obtained a thick dark oil. From the materials of recipe 2 were obtained 21.5 parts of a waxy solid.

From the foregoing discussion and examples, it is apparent that this invention provides a novel process for producing novel rosin ketones having properties adapting them for a wide variety of technical uses, for instance, in the paint industry as ester-gum substitutes and in the plastic and allied industries as plasticizers, etc. The products are made from the cheap and abundant fatty materials and rosin.

It is therefore desired to claim:

1. A compound having the formula:

wherein A represents the residue of a rosin substance selected from the group consisting of rosin, hydrogenated, dehydrogenated, disproportionated and decarboxylated rosin; the free acids corresponding to rosin and hydrogenated, dehydrogenated, and disproportionated rosin; and esters of the aforementioned acids; and

represents a fatty residue containing from 8 to 22 carbon atoms.

2. A compound having the formula:

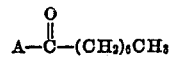

wherein A represents the residue of a rosin substance selected from the group consisting of rosin, hydrogenated, dehydrogenated, disproportionated and decarboxylated rosin; the free acids corresponding to rosin and hydrogenated, dehydrogenated, and disproportionated rosin; and esters of the aforementioned acids.

3. A compound having the formula:

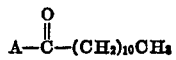

wherein A represents the residue of a rosin substance selected from the group consisting of rosin, hydrogenated, dehydrogenated, disproportionated and decarboxylated rosin; the free acids corresponding to rosin and hydrogenated, dehydrogenated, and disproportionated rosin; and esters of the aforementioned acids.

4. A compound having the formula:

$$A-\overset{O}{\underset{\|}{C}}-(CH_2)_{16}CH_3$$

wherein A represents the residue of a rosin substance selected from the group consisting of rosin, hydrogenated, dehydrogenated, disproportionated and decarboxylated rosin; the free acids corresponding to rosin and hydrogenated, dehydrogenated, and disproportionated rosin; and esters of the aforementioned acids.

5. A compound having the formula:

$$A-\overset{O}{\underset{\|}{C}}-R$$

wherein A represents the residues of a disproportionated rosin ester and $$\overset{O}{\underset{\|}{C}}-R$$

represents a fatty residue containing from 8 to 22 carbon atoms.

6. A compound having the formula:

$$A-\overset{O}{\underset{\|}{C}}-R$$

wherein A represents the residue of a rosin ester and $$\overset{O}{\underset{\|}{C}}-R$$

represents a fatty residue containing from 8 to 22 carbon atoms.

7. A compound having the formula:

$$A-\overset{O}{\underset{\|}{C}}-R$$

wherein A represents the residue of a hydrogenated rosin ester and $$\overset{O}{\underset{\|}{C}}-R$$

represents a fatty residue containing from 8 to 22 carbon atoms.

8. A compound having the formula:

$$A-\overset{O}{\underset{\|}{C}}-(CH_2)_6-CH_3$$

wherein A represents the residue of a disproportionated rosin methyl ester.

9. A compound having the formula:

$$A-\overset{O}{\underset{\|}{C}}-(CH_2)_{10}CH_3$$

wherein A represents the residue of rosin methyl ester.

10. A compound having the formula:

$$A-\overset{O}{\underset{\|}{C}}-(CH_2)_{16}-CH_3$$

wherein A represents the residue of a hydrogenated rosin methyl ester.

11. Process which comprises condensing an acyl halide, the acyl radical of which contains from 8 to 22 carbon atoms, with a rosin substance selected from the group consisting of rosin, hydrogenated, dehydrogenated, disproportionated and decarboxylated rosin; the free acids corresponding to rosin and hydrogenated, dehydrogenated, and disproportionated rosin; and esters of the aforementioned acids in the presence of a Friedel-Crafts type catalyst.

12. Process which comprises condensing an acyl halide, the acyl radical of which contains from 8 to 22 carbon atoms, with a rosin ester in the presence of a Friedel-Crafts type catalyst.

13. Process which comprises condensing a caproyl halide with a rosin substance selected from the group consisting of rosin, hydrogenated, dehydrogenated, disproportionated and decarboxylated rosin; the free acids corresponding to rosin and hydrogenated, dehydrogenated, and disproportionated rosin; and esters of the aforementioned acids in the the presence of a Friedel-Crafts type catalyst.

14. Process which comprises condensing a lauroyl halide with a rosin substance selected from the group consisting of rosin, hydrogenated, dehydrogenated, disproportionated and decarboxylated rosin; the free acids corresponding to rosin and hydrogenated, dehydrogenated, and disproportionated rosin; and esters of the aforementioned acids in the presence of a Friedel-Crafts type catalyst.

15. Process which comprises condensing a stearoyl halide with a rosin substance selected from the group consisting of rosin, hydrogenated, dehydrogenated, disproportionated and decarboxylated rosin; the free acids corresponding to rosin and hydrogenated, dehydrogenated, and disproportionated rosin; and esters of the aforementioned acids in the presence of a Friedel-Crafts type catalyst.

16. A process which comprises condensing a caproyl halide with a disproportionated rosin methyl ester in the presence of a Friedel-Crafts type catalyst.

17. Process which comprises condensing a lauroyl halide with a rosin methyl ester in the presence of a Friedel-Crafts type catalyst.

18. Process which comprises condensing a stearoyl halide with a hydrogenated rosin methyl ester in the presence of a Friedel-Crafts type catalyst.

DONALD PRICE.
EVERETTE L. MAY.